United States Patent
Bloom et al.

[11] Patent Number: 5,597,312
[45] Date of Patent: Jan. 28, 1997

[54] INTELLIGENT TUTORING METHOD AND SYSTEM

[75] Inventors: Charles P. Bloom, Superior; Brigham R. Bell, Boulder, both of Colo.; Franklyn N. Linton, Jr., Woburn, Mass.; Mark H. Haines, Arvada; Edwin H. Norton, Northglenn, both of Colo.

[73] Assignee: U S West Technologies, Inc., Boulder, Colo.

[21] Appl. No.: 237,648

[22] Filed: May 4, 1994

[51] Int. Cl.$^6$ .................................................... G09B 7/00
[52] U.S. Cl. .................... 434/362; 434/118; 434/335; 395/927
[58] Field of Search ...................... 434/118, 156, 434/169, 307 R, 308, 322, 323, 327, 362, 365, 219, 335; 395/100, 927, 154, 375, 650; 364/419.1, 419.19

[56] References Cited

U.S. PATENT DOCUMENTS

| | | |
|---|---|---|
| 4,653,085 | 3/1987 | Chan et al. . |
| 4,772,206 | 9/1988 | Kerr et al. .............................. 434/118 |
| 4,798,543 | 1/1989 | Spiece ..................................... 434/323 |
| 4,867,685 | 9/1989 | Brush et al. ............................. 434/234 |
| 4,941,829 | 7/1990 | Estes et al. .............................. 434/118 |
| 5,038,318 | 8/1991 | Roseman . |
| 5,117,354 | 5/1992 | Long et al. . |
| 5,211,563 | 5/1993 | Haga et al. . |
| 5,231,571 | 7/1993 | D'Agostino . |
| 5,267,148 | 11/1993 | Kosaka et al. . |
| 5,283,865 | 2/1994 | Johnson . |
| 5,306,154 | 4/1994 | Ujita et al. ......................... 434/362 X |
| 5,326,270 | 7/1994 | Ostby et al. ........................ 434/219 X |
| 5,372,507 | 12/1994 | Goleh ..................................... 434/118 |
| 5,395,243 | 3/1995 | Lubin et al. ............................. 434/118 |

Primary Examiner—Joe Cheng
Attorney, Agent, or Firm—Brooks & Kushman P.C.

[57] ABSTRACT

A computer based intelligent method and system for tutoring a student in an interactive application. The method and system include a computer system for selecting a mode for an adjustable teaching parameter, generating a student model, and monitoring a student interactive task based upon the teaching parameter and the student model. The method and system also include a computer system for generating an updated student model based upon a student response to the student interactive task generated, and monitoring a student interactive task based upon the teaching parameter and the updated student model.

18 Claims, 8 Drawing Sheets

5,597,312

INTELLIGENT TUTORING METHOD AND SYSTEM

TECHNICAL FIELD

This invention relates to computer based intelligent tutoring methods and systems.

BACKGROUND ART

Many customers form their initial impression of service and product providers through their telephone interactions with Customer Service Representatives (CSRs). Indeed, for service providers in particular, CSRs are called when a new customer wants services, or when an existing customer has a problem or wants information or a change of service. As a result, CSRs function as "ambassadors" to the service provider's customers and their performance can have a direct impact on customer satisfaction as well as market share.

The CSR's job is a complicated one in which they are expected to handle all manner of customer calls regarding the provider's products and services. This means that they must simultaneously carry on a consultative conversation with the caller, manipulate service order and billing software to find out information about the caller, enter information regarding service registration, rapidly look-up information about availability, compatibility and capabilities of the different products and services from reference documentation, understand all of the features and incompatibilities of the offered services, and at times prepare mailings of information for the customer. These services and products, as well as the information about them, are frequently updated, producing an ongoing learning problem in order to "stay current". Because of this complexity, it may take a year or more of training and on-the-job experience for CSRs to become fully proficient.

At present, CSR training is directed predominantly to traditional learning activities such as lectures and discussions rather than actual job practice and training. In fact, trainees spend only about ¼ of their class time practicing their job using exercises such as role plays and taking actual customer calls. However, both these techniques are less than optimal. Since instructors can only observe and coach on role play at a time, role plays are often done with little instructor interaction. Moreover, role plays are often done without access to a phone and computer terminal, the two essential components of the CSR's work environment. The result is that role playing lacks realism, minimizing the ability to prepare the trainee for the job that is to come.

Moreover, time spent by CSRs taking actual customer calls is structured so that trainees take only one specific type of call during a session, such as billing inquiries. As a result, while CSR trainees may receive dozens of calls in an average work session, they will actually handle only a limited number of those calls since calls other than a billing inquiry will be transferred to a regular CSR.

Computer-assisted learning systems have been developed to address some of the problems associated with traditional learning activities such as lectures and discussions. A typical computer-assisted learning system is illustrated in Haga et al. U.S. Pat. No. 5,211,563 ("the Haga '563 patent"). The system of the Haga '563 patent allows a trainee to access teaching materials in computer storage through a central processor via input and display devices. While such a system may free instructors to concentrate on activities other than lecturing, it merely supports student training and is unable to tutor or interact with the student as would a traditional instructor.

As a result, computer-based training programs have also been developed that deliver instructions to a student trainee. Computer-based training programs, however, deliver such instructions statically and uniformly. Thus, while again freeing instructors from lecturing, computer-based training programs still lack the dynamics associated with traditional instructors.

Therefore, a need exists for an intelligent tutoring system having dynamically organized instructional programs that employ independent representations of domain, instructional, and student knowledge enabling it to provide individualized instruction much like that provided by a personal human tutor. Such an intelligent tutoring system would provide real time, context-appropriate and cost-effective training enabling learners to perform appropriate domain tasks in the right manner and at the proper time. In so doing, such an intelligent tutoring system would decrease the time required to migrate learners from novice to expert, while increasing the number of trained personnel successfully reaching a more knowledgeable level.

An intelligent tutoring system would achieve these goals by dynamically creating and revising individual instruction plans, actively teaching difficult and abstract concepts and skills, guiding and assisting students during exploratory learning in a simulated environment, and tailoring training scenarios to the student's learning progress. More specifically, such a system would apply state-of-the-art knowledge regarding artificial intelligence, cognitive science, and multimedia to intelligently coach trainees to perform the job of the CSR.

In such a system, trainees would exercise their customer interaction skills by working through typical customer interactions in a tutoring environment that simulates their actual working environment. Trainees would study multimedia information, such as animations and video segments, prerequisite to specific types of customer interaction skills. Instruction would be trainee initiated but would also assess trainee performance and use such assessments to make recommendations about what to study or practice next, determine how to apply different instructional methods, initiate. interventions during procedural training sessions, and provide the trainee with performance feedback. Finally, such a system would also allow instructional designers to adjust instructional and student modeling parameters to further individualize the delivered instruction.

DISCLOSURE OF INVENTION

Accordingly, it is the principle object of the present invention to provide an improved computer based intelligent tutoring method and system.

According to the present invention, then, a computer based method and system are provided for tutoring a student in an interactive application. The method of the present invention comprises selecting a mode for an adjustable teaching parameter, generating a student model, and monitoring a student interactive task based upon the teaching parameter and the student model. The method further comprises generating an updated student model based upon a student response to the student interactive task generated, and monitoring a student interactive task based upon the teaching parameter and the updated student model.

The computer based intelligent system of the present invention for tutoring a student in an interactive application comprises means for selecting a mode for an adjustable teaching parameter, means for generating a student model, and means for monitoring a student interactive task based upon the teaching parameter and the student model. The system further comprises means for generating an updated student model based upon a student response to the student interactive task generated, and means for monitoring a student interactive task based upon the teaching parameter and the updated student model.

These and other objects, features and advantages will be readily apparent upon consideration of the following detailed description in conjunction with the accompanying drawings.

BEST MODE FOR CARRYING OUT THE INVENTION

The intelligent tutoring method and system of the present invention is a domain-independent platform for teaching CSRs the procedures of their job, including conversing with a customer and using order entry software. The present invention involves working through either abstract or concrete simulations of on-the-job scenarios and, when desired, reviewing related declarative material. The method and system simulate both the conversation and the order entry software, monitor the student's performance, provide feedback on their performance, provide hints on expert responses during problem solving sessions, and employ several strategies to ensure that students are continually but not overly challenged, including tailoring the style of instruction and choice of scenarios to the individual and skimming over well known parts of a scenario during problem solving.

To work independent of the domain, the method and system of the present invention maintain a strict division between the general tutoring knowledge and the domain specific knowledge. Moreover, to employ intelligent tutoring strategies, all of the structures of the knowledge base are linked, thereby enabling a student's problem solving performance to be integrated throughout the knowledge base.

Figure 1:
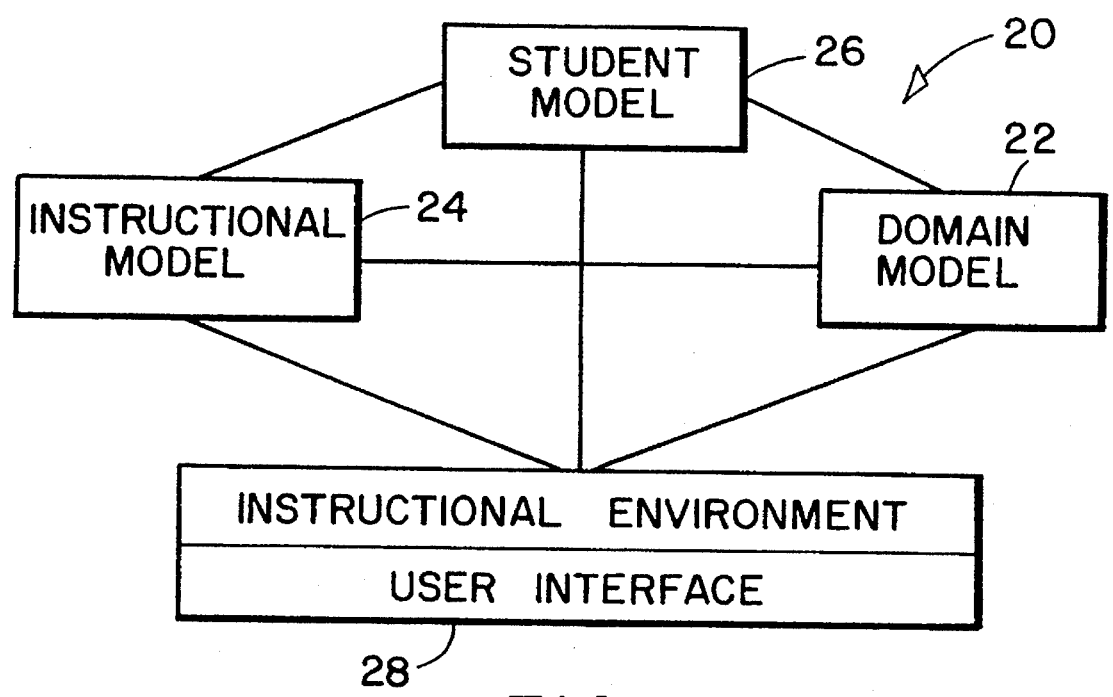
FIG. 1 is a traditional intelligent tutoring system architecture known in the art.

Referring first to FIG. 1, a traditional intelligent tutoring system architecture is shown, denoted generally by reference numeral 20. As seen therein, an intelligent tutoring system employs a basic architecture consisting of a domain model (22), an instructional model (24), a student model (26), and a user interface (28). Domain model (22) comprises a representation of the knowledge to be tutored to the student and is also used as the standard for evaluating student performance. Instructional model (24) comprises a representation of the knowledge of how to tutor the student. More specifically, instructional model (24) includes instructional methods to be employed in the tutoring system and how they are employed. Student model (26) comprises a dynamic representation of the student's state of knowledge. Finally, user interface (28) comprises a communication channel between the tutor and the student.

The intelligent tutoring method and system of the present invention will be described herein in conjunction with teaching CSRs how to operate, sell and register customers for a residential Voice Messaging Service (VMS) application. From this description, those portions of the intelligent tutoring method and system of the present invention that are reusable for other applications will be readily identifiable. A typical VMS answers incoming calls placed to the subscriber when the called number is busy or does not answer. VMS allows subscribers to record their own personal greeting or use a prerecorded greeting. When messages are waiting, the subscriber is alerted by a special "stutter" dial tone. Messages can then be retrieved by calling a special access number using a push button phone and entering a personalized security code.

Figure 2:
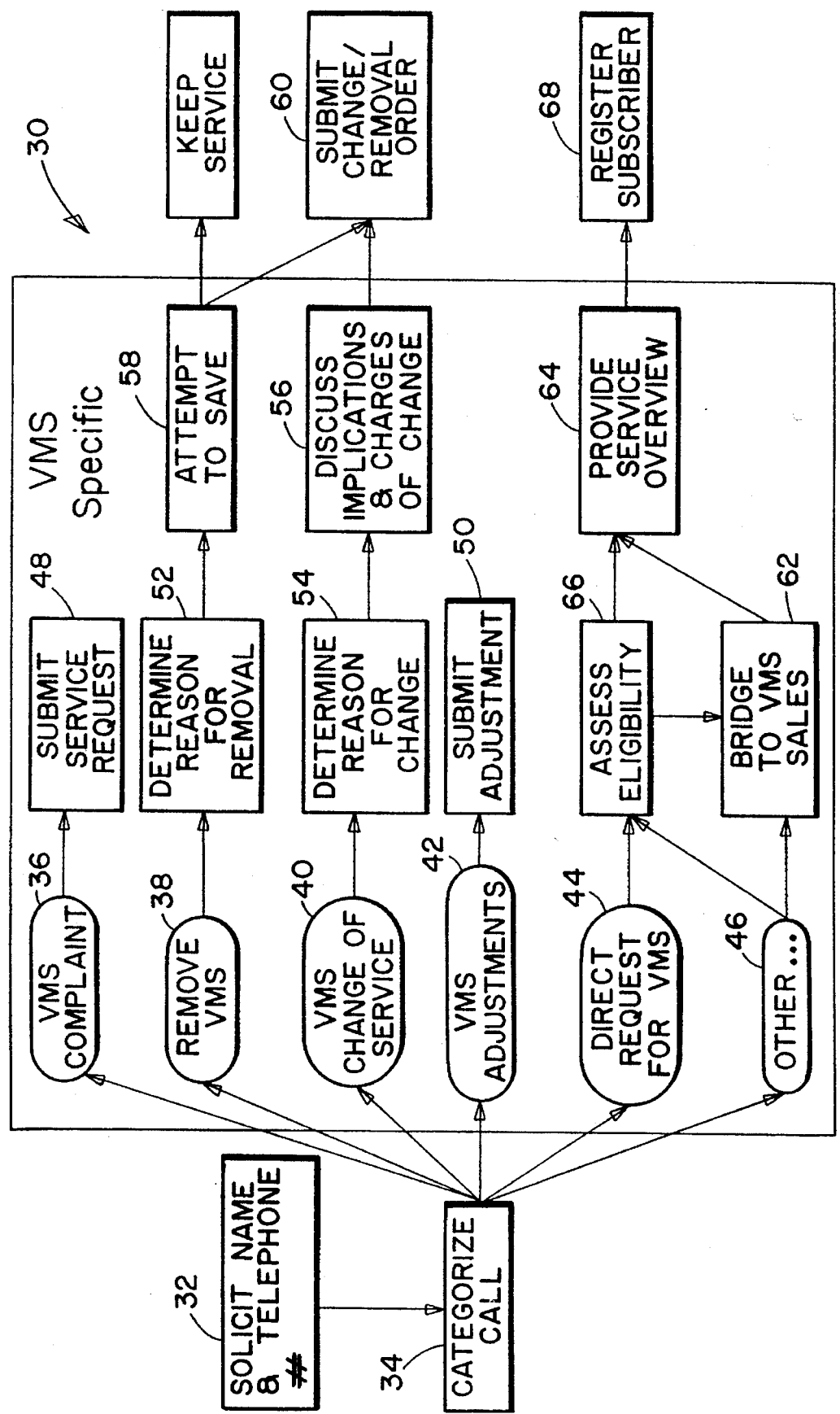
FIG. 2 is a Voice Messaging Service task block diagram for the intelligent tutoring method and system of the present invention.

Referring now to FIG. 2, a VMS task block diagram is shown, denoted generally by reference numeral 30. As seen therein, all customer contacts begin with the CSR soliciting (32) the caller's name and telephone number, which is then entered into a service order software database via a computer workstation to pull up the customer's account information. Thereafter, an experienced CSR will engage in a short conversation with the customer to determine (34) the nature of the call.

In the VMS domain, extensive task analyses have indicated that there are essentially six types of customer calls. Calls from a customer who already has VMS include those related to handling (36) a complaint about VMS, disconnecting (38) a customer's VMS, changing (40) a customers VMS in some way, and adjusting (42) a customer's VMS bill. Customer calls may also be related to direct requests (44) for VMS, as well as non-VMS matters (46).

In the case of calls in which the customer is complaining about service or billing, the CSR's task is to initiate the appropriate work order (48,50). For calls where the customer is requesting some change to the service, the CSR's task is more complicated. In such cases, the CSR must determine the customer's reasons for wanting a change or removal of service (52,54), discuss with the customer the implications of the changes (56), potentially attempt to dissuade the customer from removal of the service (58), and initiate the appropriate change or removal order (60).

Finally, in the case of calls that have nothing to do with VMS, the CSR must seek an opportunity to discuss VMS capabilities and benefits with the customer (62,64). Such a process requires that the CSR have skills in the areas of evaluating customer information for VMS opportunities, transitioning the conversation to VMS, explaining VMS benefits and features, and responding to specific customer concerns. Once the caller becomes interested in VMS, or in the case where callers making a direct request for VMS, the CSR then must assess the capability of VMS with the subscriber's other services and equipment (66), and finally register the customer for VMS (68).

During this entire process, the CSR must simultaneously converse with the customer to problemsolve and provide information, manipulate phone calls, correctly enter data into service registration and customer billing software while maneuvering through numerous screens and fields, understand all features and. incompatibilities of an offered service, look-up information about service availability and capabilities from reference documentation located on their desks, and prepare mailings of VMS information for the caller. Thus, an integral part of the CSR's job in registering customers for VMS is interacting with service registration software.

Figure 3:
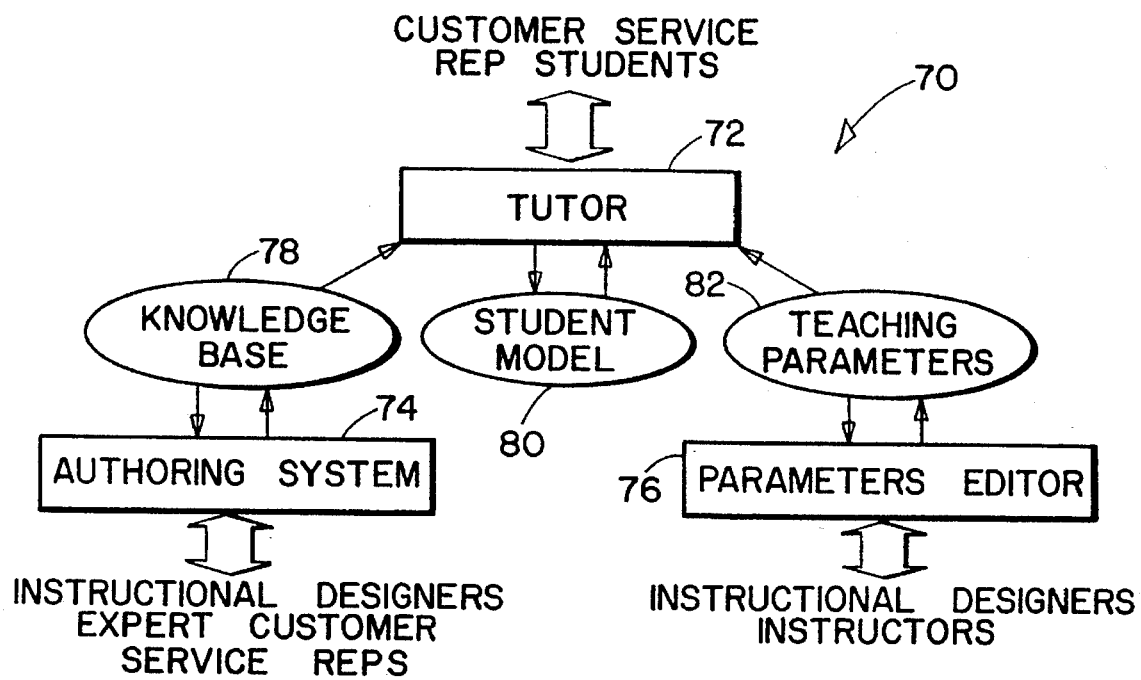
FIG. 3 is a hierarchical diagram of the intelligent tutoring method and system of the present invention.

Referring next to FIG. 3, a hierarchical diagram of the present invention is shown, denoted generally by reference numeral 70. As seen therein, the present invention comprises three primary components: a tutor (72), an authoring system (74), and a teaching parameters editor (76). Tutor (72) teaches course materials as described in a knowledge base (78), stores and uses a student's performance in a student model (80), and makes tutoring decisions based on adjustable teaching parameters (82).

The authoring system (74) permits instructional designers and domain experts to create and edit the knowledge base which, as described in greater detail below, contains information such as the course topics, the conversation discourse grammar, the discourse rules, audio and textual forms of the conversation, the application description, and the application commands. As will also be described in greater detail below, the teaching parameters editor (76) allows instructors and instructional designers to modify various instructional behaviors, such as how to recommend topics and conversations, how skimming and scaffolding during practice occur, and how factors of performance are weighed in student modeling. Thus, the functions of the present invention can be broken down into two major groupings: (i) tutor functions usable by CSR trainees; and (ii) author/editor functions usable by instructional designers and domain experts.

As again will be described in greater detail below, tutor (72) itself comprises study and exercise functions. Using the study function, trainees can study lessons presented in multimedia format on information prerequisite to the domain of study. Using the exercise function, trainees are presented with a number of different methods for working through typical CSR tasks or problems in an environment that closely emulates their actual work environment. Similarly, authoring system (74) and teaching parameters editor (76) themselves comprise conversation knowledge and instructional strategy functions, respectively, designed to support the instructions delivered by tutor (72). The conversation knowledge function enables instructional designers and domain experts to build knowledge bases of conversations for use by the exercise function of the tutor (72). The instructional strategies function enables instructional designers to adjust the parameters which the tutor (72) uses to make it tutoring decisions.

Figure 4:
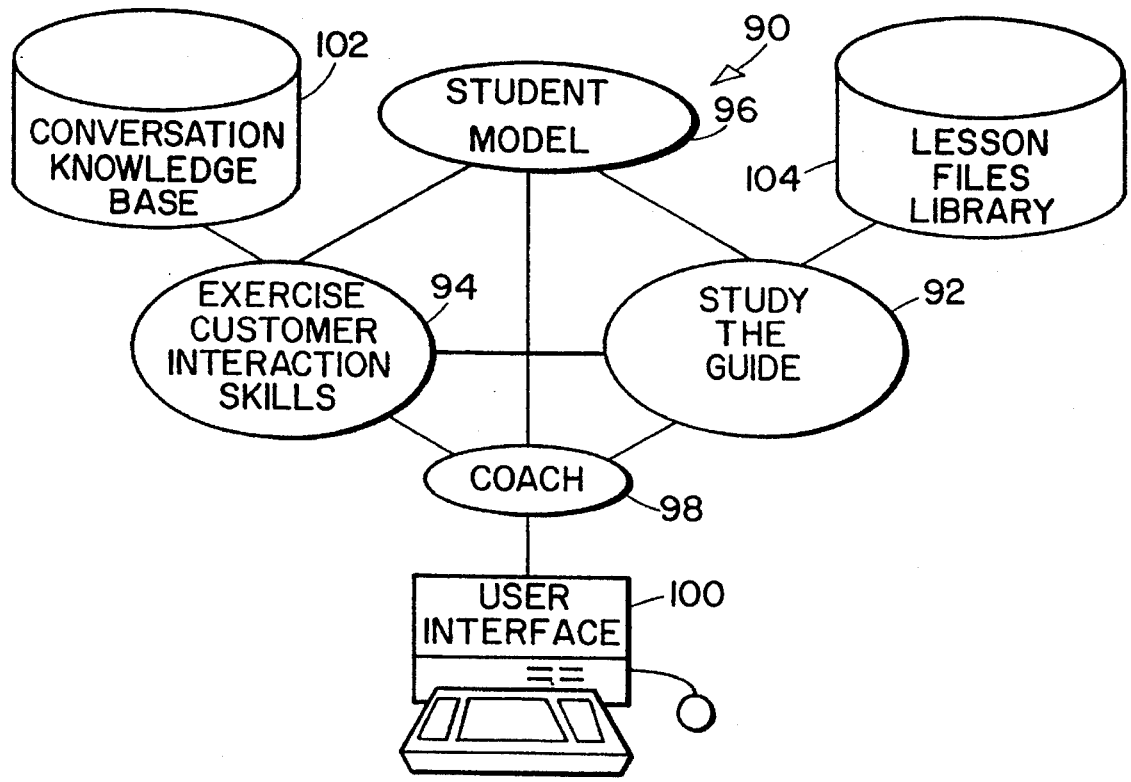
FIG. 4 is a conceptual diagram of the intelligent tutoring method and system of the present invention.

Referring now to FIG. 4, a conceptual diagram of the method and system of the present invention is shown, denoted generally by reference numeral 90. As seen therein, the method and system of the present invention comprise five-high level functions. First, a study function (92) supports trainees studying interactive multimedia lessons on information prerequisite to VMS. Second, an exercise function (94) supports trainees working through typical conversations where the goal is to handle some customer request regarding VMS, or transition a non-VMS call to a VMS opportunity. The method and system further comprise a student model (96), which dynamically represents the trainee's performance including all activities performed or observed by the trainee and the time required to perform them.

Still further, the method and system comprise a coach (98) which guides instructional activities using input from the student model (96), as well as domain and instructional knowledge. More specifically, the coach (98) provides an introspective evaluation of the trainee's skill level for a number of topics on a five point scale which are preferably denominated as "untried", "needs practice", "almost", "good", and "excellent". Coach (98) also makes recommendations about what to study or practice. Ultimately, however, instruction is trainee-initiated. That is, the trainee selects both the mode and the topic to study or practice. Coach (98) further applies various instructional strategies during a contact rehearsal based on the individual's trainee assessment, provides instructional assistance during contact rehearsal, and provides trainee performance feedback at the end of a session.

Finally, the method and system of the present invention also comprise a user interface (100) which controls the interaction with the student in as natural a manner as possible by creating an environment that emulates the trainee's actual work environment in both appearance and behavior. As will be described in greater detail below, the method and system of the present invention are also supported by conversation knowledge and lesson files library databases (102,104).

In such a fashion, the method and system of the present invention are consistent with several features of the minimalist approach to training and learning. Specifically, the present invention employs task-based training, and allow trainees to start immediately on meaningful and realistic job tasks in any order. Moreover, the present invention keeps the amount of passive instruction to a minimum. Only prerequisite information that cannot be conveyed to the trainee during active contact rehearsal is conveyed through guide (92). In addition, information in guide (92) is presented in interactive, multimedia formats to increase the level of involvement by the trainee. Finally, the present invention contains explicit training on errors and error recovery to support the recognition and recovery from error, thereby making the learning materials more robust and complete, and training learners in error recovery skills.

Figure 5:
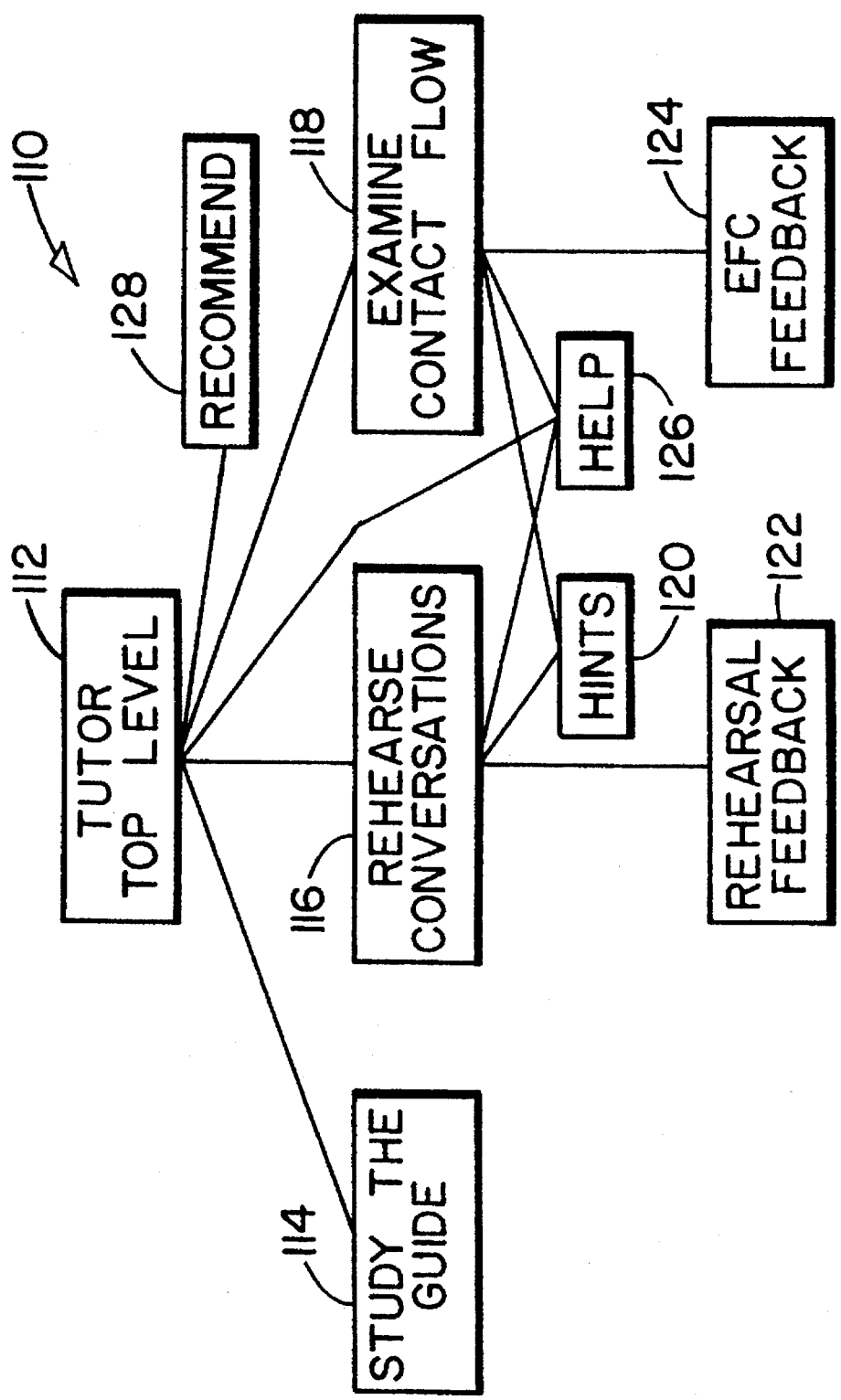
FIG. 5 is a top level function diagram of the intelligent tutoring method and system of the present invention.

Referring next to FIG. 5, the top level functions of the intelligent tutoring method and system of the present invention are shown, denoted generally by reference numeral 110. As seen therein, those functions available from a tutor top level (112) comprise a study the guide function (114), a rehearse conversations function (116), and an examine contact flow function (118). Guide (114) supports the delivery of study materials in interactive multimedia formats on topics identified as prerequisite to operating, selling and registering customers for VMS. Guide (114) operates as an interactive, multimedia "magic book" in which students can browse and study information prerequisite to a topic in a variety of different media and forms including text, digitized audio, graphics, photographs, animations and digitized video.

Each piece of multimedia is contained in separate files. Audio segments are recorded and stored on hard disk using a hierarchical file structure that maps onto either chapters in the guide (114) or conversations, which will be described in greater detail below. Video segments are recorded and transferred onto laser disks from which they are digitized. These digitized segments are also stored on hard disk using a hierarchical file structure that maps onto either chapters in the guide (114) or conversations, which will again be described in greater detail below.

Lessons in the guide (114) have been produced to a grain size that supports entry into the entire lesson and topic level, or entry into parts of the lesson as they apply to parts of conversations. This second capability is particularly useful in enabling trainees to review information from part of a lesson in the guide (114) to support their conversation rehearsals during tutoring.

Referring now to FIGS. 4 and 5, the function of exercise customer interaction skills (94) employs rehearsing conversations (116) or examining contact flow (118) as two different ways of rehearsing customer contacts. During rehearse conversation (116), tutor (112) supports trainees working through customer contacts representative of those faced on the job. As trainees work through the contacts, immediate feedback and hints (120) are available when trainees have difficulties. Moreover, at the end of each contact rehearsal, trainees are provided summary feedback (122) including assessment of their current knowledge state.

Rehearse conversations (116) is the most complex part of the present invention's instructional process. The rehearse conversation (116) instructional environment and philosophy are similar to that employed in known intelligent tutoring systems which seek to produce a situated learning environment in which trainees can acquire and exercise their knowledge and skills. However, the intelligent tutoring method and system of the present invention goes beyond known intelligent tutoring systems by providing proactive tutoring in the domains for which it was developed.

In that regard, in the present invention, an apprenticeship approach to teaching the skills and knowledge necessary for competent domain performance is used as a model of proactive tutoring while rehearsing customer contacts. The apprenticeship approach involves using methods like observation, coaching and successive approximation rather than didactic teaching. In addition, apprenticeship approaches embed the learning skills and knowledge in their social and functional contacts.

CSR-customer conversations correspond to exercises in conventional textbook instruction. The complexity associated with their rehearsal arises from the desire that trainee's work at the edge of their confidence in the context of phone conversations. Working at the edge of confidence means practicing only the task that is the current focus of attention while not redoing those tasks already known, nor doing those tasks not yet known, even though such tasks may arise. naturally during the course of a conversation. In that regard, the present invention utilizes a top down approach to instruction, putting more general before more specific objectives, and global before local skills. Thus, the present invention is capable of showing a global situation (the whole conversation) without requiring that the trainee perform the whole conversation.

More specifically, CSR-customer contacts in the present invention have two major components. One component is a dialog interaction between the customer and the CSR, while another component is an application interaction between the CSR and some service order software. Thus, a contact can be characterized as a set of situation-action rules. Typical situations may include verbal situations such as customer statements, requests or questions, as well as operational situations such as service order software output or configurations. Typical actions may include verbal actions such as responses by the CSR to customer statements, requests or questions, or to service order software information, operational actions such as commands or data entered into the service order software by the CSR, as well as cognitive actions such as those focused around information gathering, information processing, and decision making.

As an example of how a contact is rehearsed, contacts begin with a customer call which the trainee hears over the same headset they use on the job. The trainee initiates an action in response to the situation which, when correct, prompts another contact situation an so on until the conversation is complete.

For situations requiring verbal responses, the trainee's verbal response is recorded for playback/feedback purposes. After indicating that their verbal response is complete, the trainee is then presented with predefined responses and instructed to select the one that is closest to their verbal response. These predefined responses are abstract representations of possible CSR responses. When the verbal response selected by the trainee is incorrect, the trainee is provided with immediate feedback to that effect which allows them to attempt to select the correct response. If the trainee prefers, they can ask coach (98) for hints (120), or even ask coach (98) to show them the correct answer. Once they have input the correct response, the customer contact continues.

At times, instead of a verbal response, the trainee is expected to take some action in service order software. This is done through trainee interaction with an application simulation, which will be discussed in greater detail below. When the trainee action is correct, the contact continues uninterrupted. When the trainee's action is incorrect, coach (98) notifies the trainee that their answer is incorrect, provides them with a hint, and recommends they try again. As in conversation hints, if the trainee is still unable to provide the correct response, they have the option of requesting the correct response, and even having coach (98) perform that correct response for them. Again, once the correct response has been input, the contact continues.

Significantly, as is readily apparent from the foregoing discussion, rehearse conversation (116) accomplishes four important points. First, customer statements are heard rather than read in order to better emulate the "job" environment of the trainee. Second, the trainee's verbal responses are recorded for use in end-of-conversation feedback/reviews. Third, selection of predefined responses is employed in order to overcome limitations of natural language understanding. Finally, the application that trainees interact with is an accurate simulation of the application they will use on the job.

Within rehearse conversations (116), there are three study styles employed. Those study styles are referred to as "observe", "focused practice", and "full practice". Any of these study styles can be chosen independently for dialog and service order software interactions.

More specifically, with the "observe" study style, the trainee is shown how a task is performed with both sides (customer and CSR) of a VMS-related contact being demonstrated. This can include all verbal statements made by either the customer or the CSR, the cognitive actions (strategic decisions) made by the CSR, and all service order software actions. The trainee observes the demonstration and builds a conceptual model of the task, in this case, a telephone contact with application use. When a trainee observes a conversation they receive "credit" with the student model even though they did not do any of the conversation (or application) interactions.

With the "full practice" study style, the trainee's knowledge and skill levels are measured under as realistic conditions as possible. In that regard, the trainee is expected to perform all activities required of the entire contact. Finally, in the "focused practice" study style, the functions of the "observe" and "full practice" study styles are combined. In such a fashion, parts of the contact are performed for the trainee and other parts of the contact are performed by the trainee. As will be discussed in greater detail below, the assignment of who does what part of the contact is based on the combination of an assessment of the trainee's current knowledge state and the instructional strategies available, as well as the teaching parameter settings that control their application.

By applying the "observe" style to either dialog or service order software interactions and applying either the "focused" or "full practice" style to the other interactions, the present invention incorporates some of the principles of part-task training and reduction of cognitive load. If the method and system of the present invention perform the dialog interaction, the trainee is able to focus all of their attention on the service order software interactions. If the present invention performs the service order software interactions, the trainee is able to focus all their attention on the dialog interactions. It should be noted that the credit a trainee receives is greatest when he performs an activity unaided. Credit is degraded depending upon how much help they receive from the coach (98) in the form of being shown hints, correct responses or having the correct response performed for them.

Still referring to FIGS. 4 and 5, examine contact flow (118) is another function available from tutor top level (112) and forms a part of exercise customer interaction skills function (94). In examine contact flow (118), the present invention supports the trainee's exploration of the underlying conversation structure by allowing them to navigate the grammar, select which branch to take, and back-up and try different alternatives. Just as when rehearsing conversations, trainees can set the instruction style independently for both dialog and service order software interactions to "observe", "focused practice", or "full practice". When set to "observe", the trainee can see how the tutor would respond to conversational situations they select When set to "full practice", in addition to selecting the conversation situations, the trainee must also select the response to those situations and have their selection evaluated. In both "focused" and "full practice", hints (120) are also available from coach (98).

Once again, in "observe" study style, the trainees receive "credit" with the student model (96) for those situation-action rules they examine. In "full" or "focused practice", the trainees receive student model (96) assessments for the situation-action rules they interact with, and credit for those situation-action rules they may observe. As in conversation rehearsals, the credit the trainee receives is degraded upon how much help they receive from coach (98).

When the student is put into either the rehearse conversation or the examine contact flow environment, the present invention picks a practice mode for the student among the "observe" "focused practice" and "full practice" choices.

The choice of a practice instruction style is made according to the following rules. If the conversation is a repeat practice, then the instruction style is incremented one level. For example, instruction style may be incremented from "observe" to "focused practice", or from "focused practice" to "full practice." If the topic being covered is "untried", then the instruction style chosen is that of "observe." Finally, if the topic being covered is not "untried" then the instruction style chosen is that of "focused practice."

Still referring to FIGS. 4 and 5, user interface (100) is the means by which trainees interact with the method and system of the present invention. User interface (100) also defines how trainees interact with the domain being tutored.

A number of design principles are adhered to in order that the user interface (100) may provide an intuitive window to the domains being tutored. First, all interactions via user interface (100) take place in a first person (i.e., direct manipulation) manner. In other words, all activities are carried out by single-action manipulation of graphic objects that map directly onto the task and domain of study. Second, all objects may be manipulated or used via user interface (100) in any way for information conveyance and are visible to the user (i.e., no pull-down menus or keystroke-mouse combinations to see additional options). Third, interface objects are grouped according to functionality. For instance, objects concerned with system navigation are kept together and are also kept separate from objects concerned with dialog control (which themselves are kept together).

Fourth, the method and system of the present invention neither require nor allows the user to control the presentation or appearance of any of the interface objects. Trainees need to expend their mental energies on learning the domain of question, not on customizing user interface (100). Finally, functions are broken down into screen-sets, with all activities possible for a given function supported within the screen-sets objects. For example, when a trainee rehearses a conversation (116), all of the interface objects required to support that rehearsal are contained within its screen-set (i.e., dialog objects, dialog control objects, feedback objects, session trace objects, and system navigation objects). If, during that rehearsal, the trainee wishes to review a portion of the guide (92) for the topic they are rehearsing, transitioning to the guide (92) would require exiting the rehearsal (116) screen-set and entering the guide (114) screen-set. While in the guide (114) screen-set, the trainee would neither see nor have access to any of the rehearsed conversation (116) screen-set objects, unless they were to return to that function.

As shown in FIG. 5, there are six distinct screen-sets within the method and system of the present invention. In addition, there are pop-up "help" (126) and "recommend" (128) windows that can appear. Top level tutor (112) screen-set provides the trainee with one window containing the set of command objects for accessing various tutor functions (i.e., navigation and recommendation), and a selectable scrolling, hierarchical list of topics (or conversations) available for study and their proficiency with those topics. Study the guide (114) screen-set provides the trainee with one window resembling an "interactive" book. The guide (92), depicted in FIG. 4, contains "index markers" to provide interactive access to the various lessons. Each page of guide (92) can contain text, audio, graphics, animation and/or video sequences. In addition to continual access to the guide (92) index markers, navigation functions are also provided for "paging" forward or backward, or for exiting the lesson and returning to the particular screen-set from which guide (92) was called.

Rehearse conversations (116) screen-set provides the trainee with a window containing the set of rehearse conversation commands, a window containing a simulation of the service order software, and another window where all dialog interaction activities take place. In addition, trainees can access a selectable window containing a scrollable trace of the current session enabling the trainee to interact with that trace to hear previous recordings, and can also access pop-up "help" (126) and "hint" (120) windows. Rehearsal feedback 122 screen-set is a super-set of the rehearse conversation (116) screen-set. In place of the dialog window of the rehearse conversation (116) screen-set the rehearsal feedback (122) screen-set has a feedback window.

Examine contact flow (118) screen-set provides the trainee with a window where all dialog control activities take place, another window containing the service order software, and a third window containing a set of relevant commands. As in the rehearsed conversation (116) screen-set, trainees can access a scrolling trace in "Help" (126) and "Hint" (120) windows. Finally, examine contact flow feedback (124) screen-set is a super-set of the examine contact flow (118) screen-set. In place of the dialog window of the examine contact flow (118) screen-set, the examine contact flow feedback (124) screen-set has a feedback window.

Referring again to FIG. 4, student model (96) is essentially a dynamic data structure that maintains a "model" of each trainee within and across training sessions. Student model (96) is used to actively assess the trainee's mastery of the learning materials, represent the trainee's progress through the learning materials and recommend topics or conversations the trainee needs to study or practice, select and present instructional interventions at appropriate levels of understanding, apply selected instructional strategies during contact rehearsals, and provide the trainee with performance feedback.

To accomplish these objectives, the student model (96) is comprised of four major components. The first component, a student model data structure, is a dynamic representation of the knowledge and skills to be learned with associated confidence estimates. Student model (96) also includes a student model performance modeling function as a mechanism for tracking all trainee activities within the tutor and mapping them to the student model data structure. A student model updating function provides statistical techniques for going from a trainee's individual actions to estimates of how well the trainee knows each identified item of knowledge or skill. Finally, a student model diagnostic algorithm provides techniques for interpreting the student model data structure and applying the various learning techniques employed in the present invention.

Consistent with operator function models known in the art, student model (96) represents contact scenarios in a hierarchical network, with scenarios in major topics at the highest level, and individual conversation activities at the lowest level. Action can be verbal (i.e., responses by the CSR to the customer or to service order software output), operational (i.e., commands or data entered into the service order software by the CSR), or cognitive (i.e., information gathering, information processing and decision making).

Figure 6:
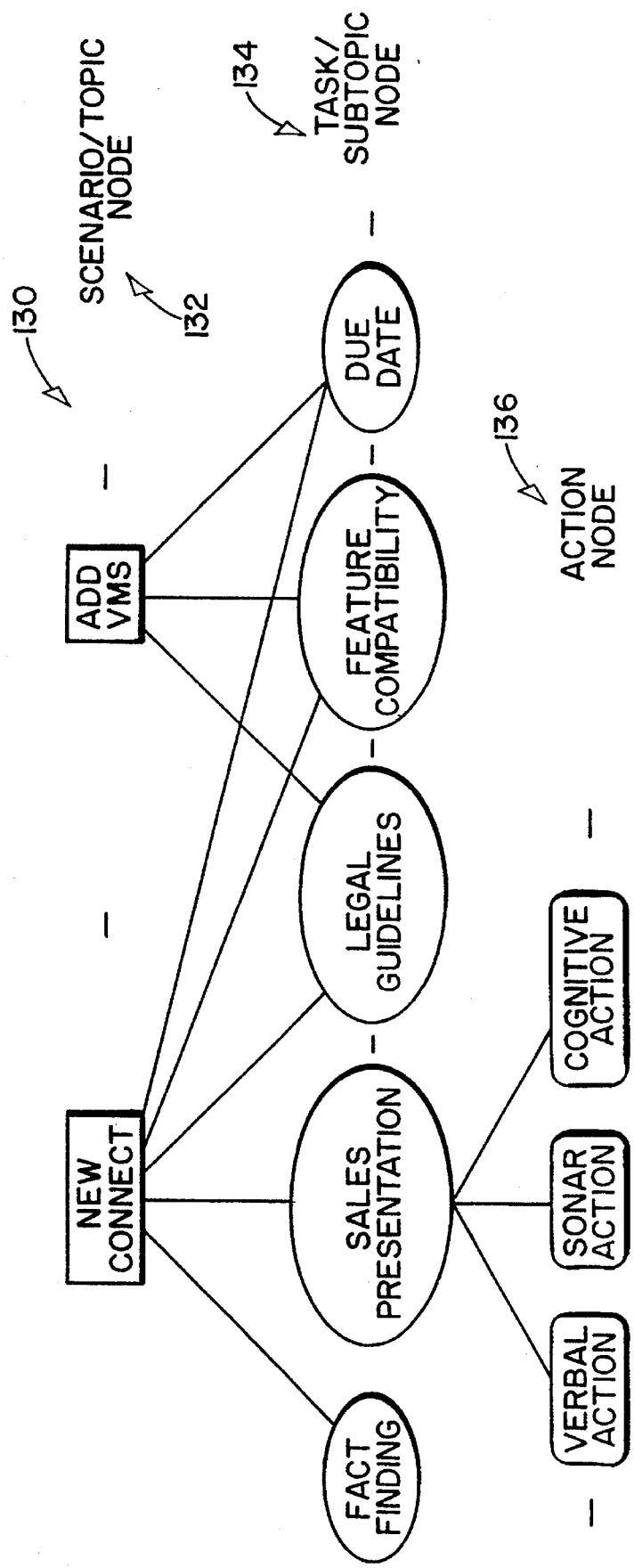
FIG. 6 is a subset of a student model representation for the intelligent tutoring method and system of the present invention.

Referring now to FIG. 6, a subset of a student model (96) representation is shown, denoted generally by reference numeral 130. As seen there, the top level is referred to as the scenario or topic node level (132) and represents all of the possible conversational scenarios in which the CSR can engage. The second level is referred to as the task or sub-topic node level (134) and represents all of the major tasks or parts of conversations within each scenario or topic. The lowest level, previously described, is referred to as the action node level (136) and represents the individual actions available to the trainee.

Significantly, the parameters used in the student model updating function are adjustable. The student model of the present invention is based on the observation that the probability of a correct response increases as a function of the number of previous correct responses. The student model considers the weighted values of the number of times the user has observed a particular situation-action pair performed, the user's average score on each situation-action pair, and the strength of the user's knowledge based on the number of consecutive correct (or incorrect) responses for the particular situation-action pairs performed. The student model output is a number (from 0 to 1) that predicts, roughly, the likelihood that the user will do the situation-action pair correctly the next time it appears. Each situation-action pair in the domain knowledge base has this predictive value attached. The values of situation-action pairs are aggregated to provide ratings for each conversation and each topic. The present invention uses these numbers, along with other information, to make several tutoring decisions, including situation-action pair presentation, exercise selection, and topic recommendation.

More specifically, for each trainee, while rehearsing contacts the present invention records three pieces of data for each situation-action rule: (i) an average correct score; (ii) the number of consecutive correct or incorrect responses; and (iii) the number of times a rule is seen but not practices. These data points are combined using a weighted function where the weights for each factor are interrelated and adjustable. With a 65% weight, the consecutive correct answers are counted so that with each new correct answer the evaluation is bumped by an increasingly smaller margin, following a learning curve. With a 25% weight, the average correct over all time is added. Finally, with a 10% weight, the number of times seen is counted so that with each additional observation the evaluation is bumped by an increasingly smaller margin, following a learning curve.

The computer value is a measure of confidence that the trainee can perform the activity associated with the situation. The value is updated each time a trainee sees or responds to a situation-action rule. The values from the situation-action rules are propagated up to parts of conversations (i.e. sub-topics) and ultimately up to the conversation or topic level. These propagated estimates are then converted into one of five categorical labels (i.e., "untried" "needs practice", "almost", "good" or "excellent". The categorical conversation is also adjustable, so that instructional designers or field instructors can vary the scores a trainee needs to move from one level to the next.

The diagnostic algorithm of student model (96), depicted in FIG. 4, is based on two assumptions. First, the effect of practice on learning skills and knowledge can be fit into a traditional, negatively accelerating learning curve, such that the more one practices the greater the odds of responding correctly. Second, the need for practice can be fit into a negatively decelerating learning curve, such that as skills increase, the need for practice decreases. As stated previously, each trainee has their own student model representation that is saved across training sessions, enabling the trainee to resume their instruction based on their performance in previous sessions.

Referring once again to FIG. 4, coach (98) preferably provides trainee coaching in four areas. More specifically, coach (98) provides trainee coaching with recommendations, instructional strategies, instructional assistance, and session feedback. Coach (98). recommends topics to study or practice based on a consideration of three adjustable parameters: (i) topic sequence; (ii) relation to last topic study; and (iii) trainee's topic-level proficiency. Different configurations of these parameters will result in different recommendations.

With respect to these parameters, topic sequence is a representation of the hierarchical and natural sequences to the topics from start to finish, and from simple to complex. Relation to last topic studied represents topics related in terms of content covered. Finally, trainee's topic level proficiency represents how well the trainee knows a topic. These parameters are normalized to the same scale and then weighted with 70% for the proficiency rating, 25% for the relation to the last topic studied, and 15% for the distance from the top. This weighting is an adjustable instruction parameter.

After recommending a topic, a method of studying the topic is then recommended. Study methods include either of the study the guide (92) or exercise customer interaction skill (94) functions previously described. To select a study method to recommend, the present invention employs an algorithm wherein it is first recommended that the topic be studied in guide (92). Next, it is recommended that the trainee see a demonstration of a customer contact related to the selected topic. Finally, it is recommended that the trainee practice that contact in simulated conversations. In addition, trainees can elect to examine the flow of a particular customer/CSR contact.

More specifically, instruction style recommendation is based on the topic recommendation according to three rules. If the recommended topic has a direct mapping to a part of the study guide and the student has not previously seen the guide for this topic, then it is recommended that the student study the guide. If the recommended topic has a proficiency rating of "almost" or "good" and this topic covers grammars that have multiple branches in the contact flow, then it is recommended that the student examine contact flow. Finally, if neither of the above rules apply, then it is recommended that student rehearse conversation.

With respect to instructional strategies, the present invention employs four specific study methods in the "focused practice" study style previously described. These study methods are known in the art as "skimming", "scaffolding", "fading", and "feedback".

Skimming takes place when it is determined that the trainee already knows a specific situation-action rule. To skim means that both the situation and its appropriate action are presented to the trainee, so that the trainee need only select the appropriate action to continue the conversation. The use of skimming by coach (98) is probabilistic. That is, trainees always have to perform action rules that are new to them and within the current topic of focus. Once the trainee has demonstrated that the situation-action rule is known to them, most of the time it will be skimmed. However, occasionally, the trainee will be asked to respond. This element of unpredictability contributes to maintaining the attention to the task as a whole.

Scaffolding takes place when some material is unknown to the trainee and is not part of the current focus of instruction. In scaffolding, as in skimming, both the situation and its appropriate action are presented to the trainee and the trainee need only select the appropriate action to continue the conversation. Scaffolding also affords trainees the opportunity to observe and perform activities beyond their current capabilities and begin forming a model of that part of the task. Skimming and scaffolding make it possible to support a situated learning model. Trainees can practice specific skills or parts of conversations in the context of entire conversations. However, the method and system of the present invention do not waste time making the trainee redo well known tasks, or try to perform tasks that they are not yet capable of performing.

Fading consists of the gradual removal of "supports" until the trainees are on their own. In the method and system of the present invention, fading is used to support learning situation-action rules where the situation has no explicit features. For example, before selling VMS to a customer, a CSR may be expected to remember to tell the customer that VMS is a competitive service available from multiple providers. There are no explicit situations to simulate this action—the CSR must remember to make this disclosure on their own. To support learning of responses to inquisitive situations, the method and system of the present invention will initially present CSRs with an explicit situation which gradually "fades", ultimately requiring the trainee to perform this action from memory as they would have to an actual conversations.

The final instructional strategy employed in the present invention is feedback. As the trainee works their way through a conversation, if their action is correct, conversation continues. If, on the other hand, their action is incorrect, they are provided with a hint and allowed a second try before being supplied with the correct action so that the conversation may continue.

Instructional assistance during contact rehearsal in the present invention is preferably one of three types. Those instructional assistance types are denominated as "user requested hints", "system initiated hints", and "user requested system help". With user requested hints, at any point during contact rehearsal, the student can request a hint from coach (98) by selecting an appropriate command. Hints are presented in two levels. At level one, hints contain both the contacts of the current contact (i.e., what stage of the contact the trainee is in) as well as the specific contact situations. In addition, level one hints contain a "show answer" command designed to take the trainee to a level two hint. Level two service order software hints provide the answer to the trainee in text form along with an optional "demonstrate" command with which the trainee can have the action performed for them. Level two dialog hints, in addition to a textual answer, provide the trainee with an option of "hear expert" command which enables them to hear how an expert would respond in this situation before recording their own response.

With system initiated hints, in the case of dialog activities, when the trainee inputs an incorrect response, they receive immediate auditory feedback to that effect. In the case of service order software activities, when the trainee inputs an incorrect response, they receive a hint summarizing what is expected and what was actually input by the trainee. Included in the hint is a command which, when selected, takes the trainee to a level two hint for that situation, as described above. Finally, with user requested system help, at any point during a contact, trainees can request help on how to interact.

Figure 7:
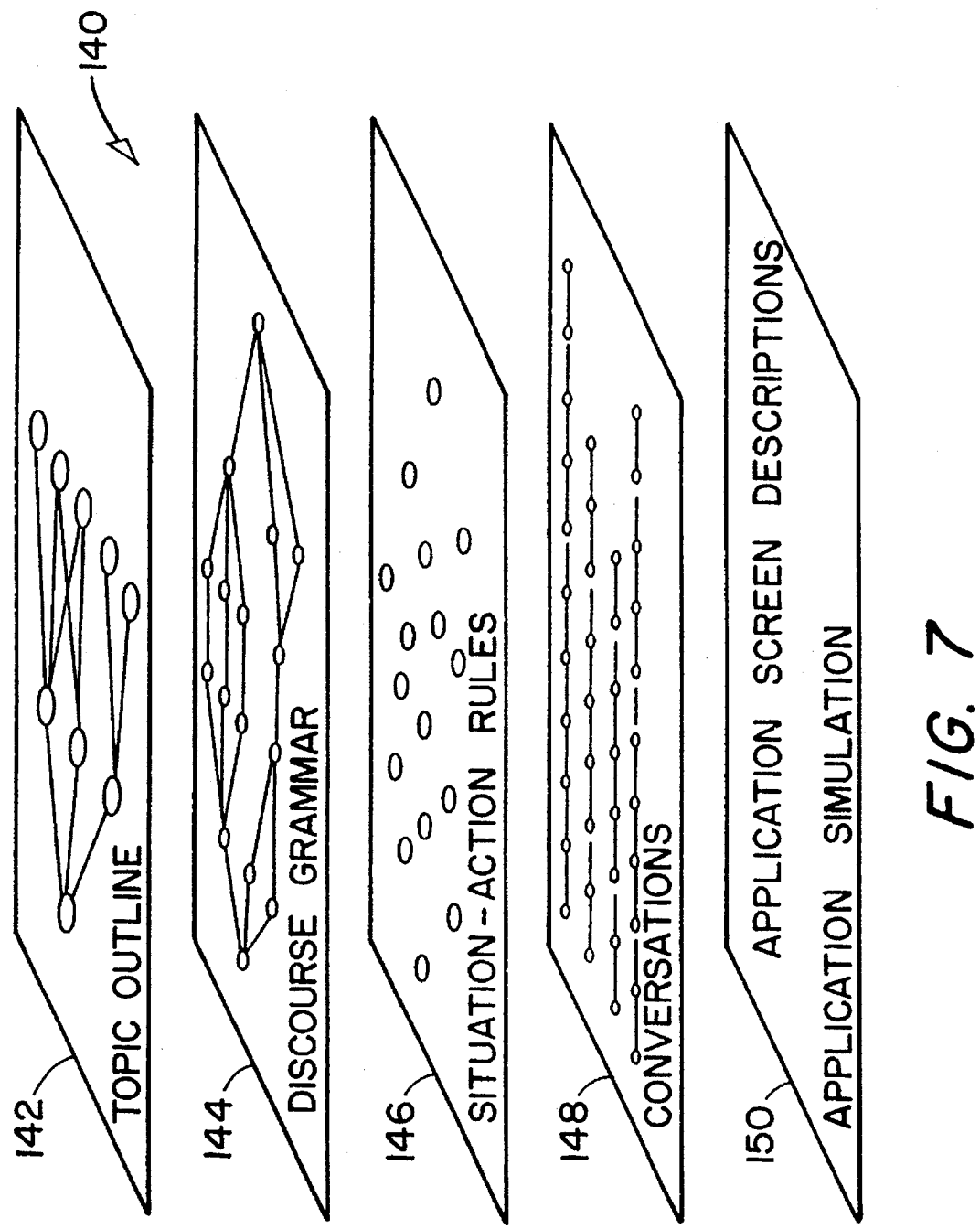
FIG. 7 is a knowledge base hierarchy diagram for the intelligent tutoring method and system of the present invention.

Referring now to FIG. 7, a knowledge base hierarchy diagram is shown, denoted generally by reference numeral 140. The present invention has a strong division between the domain knowledge and the tutoring techniques. All of the domain knowledge is defined using representations permitted by the knowledge base (140). Each of the layers of the knowledge base describe one aspect of the domain and can be connected to other aspects. Objects at each layer often refer to objects one layer higher or lower.

As seen therein, at the top level of the knowledge base hierarchy (140) is a topic outline (142). Topic outline (142) serves as the top level representation of the tutorial materials. A collection of topics can be viewed as a hierarchical, multi-level index in which each topic to inked to sub-topics, and at each level topics are ordered sequentially. Topic outline (142) defines the structure of the course as the student can see it from the top level. Topic outline (142) is a directed acyclic graph, allowing any topic to be categorized within more than one topic and to be refined to any level of depth.

The topics in topic outline (142) map in a one to many relationship to the nodes at the next level—the discourse grammar (144). Discourse grammar (144) is a network representation of all of the conversation sub-topics, and the interconnections between those sub-topics observed in the operational environment. In other words, the discourse grammar (144) is a representation of the complete collection of possible customer/CSR conversations that the method and system of the present invention will support. Discourse grammar (144) could be used to describe all possible conversations that happen in practice, but for purposes of training it only need represent the subset most useful for teaching the material. The structure of the grammar is a recursive transition network (RTN).

Still referring to FIG. 7, the discourse grammar (144) then maps onto sets of situation-action rules (146). Situation-action rules (146) are the individual transitions in the discourse grammar (144) describing actions to be taken in response to given situations. Situations can be either customer statements, requests, or questions, or service order software output or configurations. Actions can be either responses by the CSR to customer statements or to application information, commands or data entered into the application by the CSR, or actions focused around information processing and decision making, as previously described.

The next level of hierarchy (140) is conversations (148). Conversations (148) are syntactically correct sequences through discourse grammar (144) made up of sequences of situation-action rules (146). Each abstract situation and action in a conversation sequence is instantiated with specific information in the form of application commands or information, or text with accompanying audio. Conversations (148) are grouped together to reflect different types of scenarios that could occur between a caller and a CSR. Branches within conversations (148) are based on customer information. Situation-action rules (146) that are conceptually related map onto discourse grammar (144) nodes. These nodes are reusable portions of conversations that can appear in several different conversation scenarios. Ultimately, a specification of each of these layers defines a course, such as VMS. A course has a title, list of topics, a list of grammars, a list of activities (situations or actions), a list of conversations (subsuming text, audio, and application communication) and a list of application specifications.

From the foregoing, it is apparent that a grammar is a set of conversations in an AND/OR tree, where nodes are situation-action pairs, and branches are different possibilities based on the customer situation such as whether the customer has a private line or a party line, or whether the customer accepts or rejects the CSR suggestion. Every path through the grammar is a valid conversation. Grammar is also the conversation space, the space of all conversations, or the knowledge base. A topic is a portion or portions of the grammar that are conceptually related. Each type of conversation is a major topic. Each part of a conversation is a sub-topic. Each conversation addresses several sub-topics.

At the final level of hierarchy (140) is application simulation (150). Application simulation (150) is made up of actual application screen images and descriptions which are linked into specific conversation situation-action rules (146). The application descriptions include information about input and output fields and the values expected in them.

Figure 8:
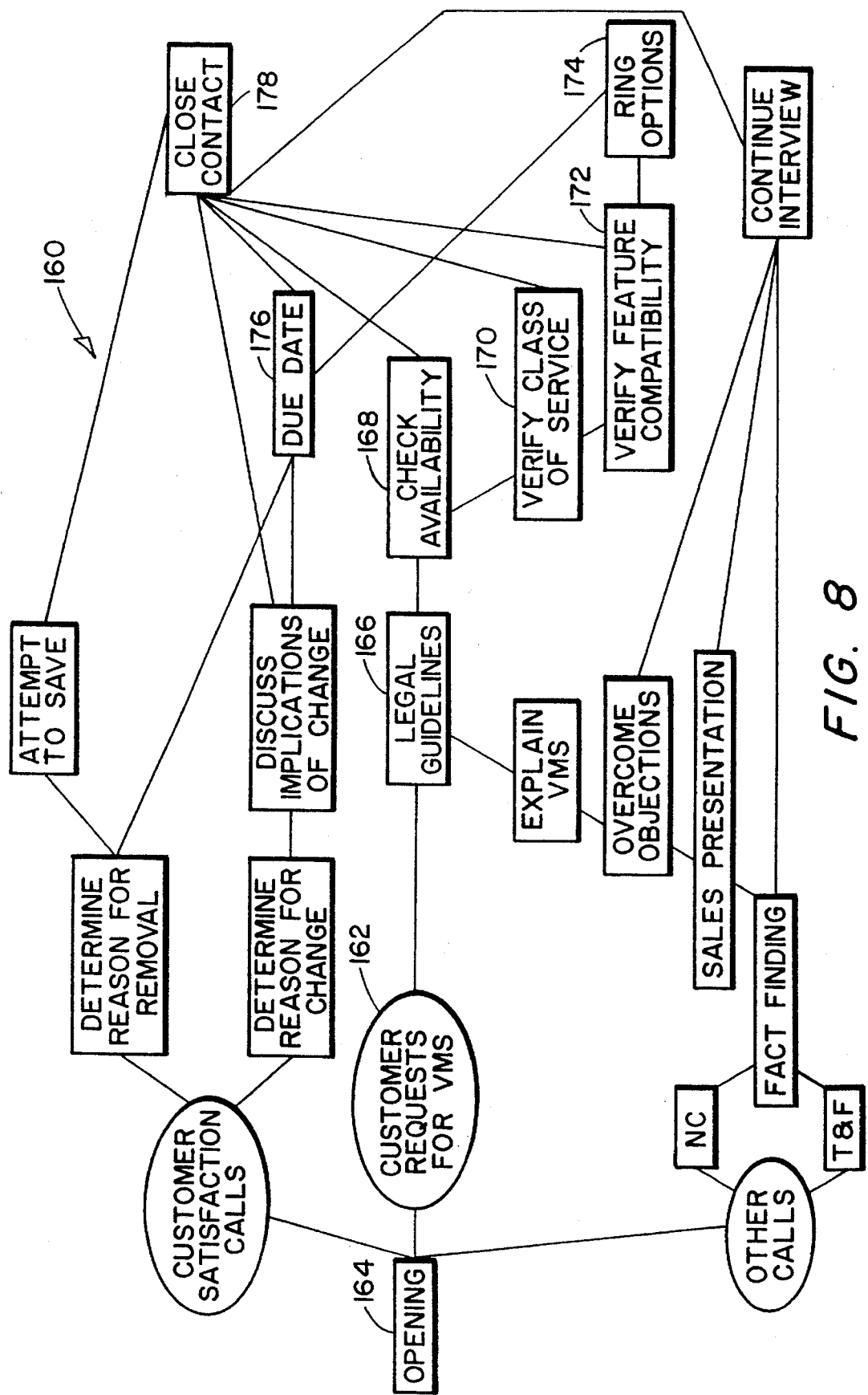
FIG. 8 is a subset of a discourse grammar representation for the intelligent tutoring method and system of the present invention.

Referring now to FIG. 8, an example of a subset of the discourse grammar representation is shown, denoted generally by reference numeral 160. Conversations or scenarios can be constructed by combining all of the individual nodes along any one branch (from left to right) of the discourse grammar. For example, the scenario of servicing a customer's direct request for VMS (162) could involve some or all of the following: opening (164), legal guidelines (166), check availability (168), verify class of service (170), verify feature compatibility (172), ring options (174), due date (176), and close contact (178). The specific sub-topics employed would depend upon "customer" responses or constraints. That is, if the service is not available in the customer's area, the scenario would contain only opening (164), legal guidelines (166), check availability (168), and close contact (178).

Referring again to FIG. 7, each topic in topic outline (142) is specified with a name, a description, a reference to declarative material, a list of subordinate topics, a list of topics to which it is subordinate, a list of topics that it requires, a list of topics required by it, a list of grammars that cover this topic, a list of activities that cover this topic, and an estimate of how proficient the current student is with this topic. A sublink structure defines the decomposition of the topics. A requirements link structure defines the order in which the topics should appear to a student.

Discourse grammar (144) defines abstractly a set of possible discourses using an RTN. RTN formalism permits a discourse to be decomposed into grammars that describe specific sub-discourses for readability and reuse. Discourse grammar (144) is a collection of grammars of which one is the top level grammar. An individual grammar definition preferably includes a name, a nickname, author comments about the grammar, a context describing the purpose of this part of the discourse to a student, a list of topics that this grammar covers, a syntax defining the paths, the list of activities used by the grammar, the grammars that this grammar calls, the grammars called by this grammar, and the depth of the grammar within the grammar calling structure. The RTN permits situation-action pairs to be strung together as a sequence of steps to take with possible decision points in the sequence. A Backus-Naur Form (BNF) specification is the syntax for defining the transition networks.

In the situation-action rules (146) level, an activity preferably has a name by which it can be referenced within an RTN, a text that describes the activity, the grammars within which it is used, the topics that it relates to, a comment from the author of the material, instances from the conversations shown as text, instances from the conversations referring to audio files, and a reference to the student's encounters with this activity. An action has feedback which can be presented to the student as a hint, and false responses which are actions to present as false distractors when giving a multiple choice question. An application action is an action describing interaction with application software.

In the conversations (148) level, various paths through the grammar are described. The activities of the path are filled in with specific commands to the application and specific text in audio and string forms. The conversation preferably has a name, a long name by which a student can reference it, a sequence of instances defining the path, a file name in which it resides, the instructional importance of this conversation, a conversation from which it inherits, application-items that denote what conversation-specific information needs to be loaded into a currently running application simulation, the volume for normalizing the expert CSR speaker, the volume for normalizing the contact speaker, a video summary, and the challenge this conversation would be to the current student represented as an integer and as a label. An activity-instance pairs a conversation-specific situation or action with the abstract activity from the grammar.

At the application simulation (150) level, the present invention runs a simulation of an application rather than the application itself in order to better control what is actually presented to a student. The look of an application is simulated by displaying screen representations that relate directly to the application. The simulator assumes standard keyboard interaction with the application.

An application description preferably has a name, a list of screen definitions, the initial screen of the application, and a description of how to jump from screen-to-screen. An application screen describes one screen that has a name and a list of fields that make up that screen. The screen item describes an item of the screen and has a name by which it can be referred, a position and a size within the screen, and a default value. The value can be defined as a string or dynamically by a function. For example, a field showing the date or time would refer to a function, which supplies those strings. A screen label is a screen item which is not editable by the user. A screen field is a screen item which is editable by the user. An application field entry defines how items in the application should be filled out. This structure is to communicate commands when running a conversation, and to define how conversation specifics should be filled in. A screen sequence defines a sequence in which the screens are shown, and has a predicate which is applied to any conversation name to determine whether the sequence is appropriate for that conversation.

Referring again to FIG. 3, authoring system (74) provides tools for non-programmer instructional designers and domain experts to easily generate the knowledge bases required for the method and system. The authoring tools provide simple construction of the conversations. Authoring of the other parts of the knowledge base are done primarily with text.

The authoring tools include a topic editor for developing high level topic structure, a grammar builder for building a discourse grammar to be used in contact rehearsals that corresponds to the topic structure, a conversation author for authoring conversations to the grammar, a simulation builder for building the application simulation used during contact rehearsals, and a parameter adjuster for adjusting the instructional parameters used in making instructional decisions.

The topic, grammar, and activity levels are all authored by giving a text description and a syntax that directly maps to the underlying knowledge structure. The topic definition permits the textual specification of the name, description, declarative topic and sub-topics. The grammar definition permits the textual specification of the name, nickname, comment, context, topics and syntax. The activity definition permits the textual specification of the name, text and comments. In addition, an action activity permits specification of the feedback, false responses, allow-anything, and commands.

The topic editor is a tool intended to help course developers easily build a course structure, from the high level topics to the low level concepts that a course must teach. The topic editor enables topics to be created, named, modified, and connected to other topics. Topics are connected together by two kinds of links, requirement links and sub-links. A requirement link between two topics means that one topic requires the other topic before it is taught. A circular arrangement of requirements is not permitted. A sub-link between two topics means that one topic is a sub-classification of the other topic. A circular arrangement of sub-links is also not permitted.

A topic browser is provided as a means of viewing, browsing and editing this structure in detail and at higher levels. At the detailed level, the following attributes of a single topic may be viewed and modified. The "topic name" is a single phrase that quickly describes a topic and is used when other topics refer to that topic. The "topic description" is a longer piece of text that describes this concept or topic and would be seen by a trainee either browsing the knowledge or when they made a mistake in a problem related to that topic. The "subs" are the topics that are sub-classifications of this topic. The "supers" are the topics that contain this topic as a sub-classification. The "requires" are the requirements for this topic, and the "required by" are the topics that require this topic.

At a high level, a collection of topics is viewed as an index and as an outline. As an index, each topic is listed once alphabetically. As an outline, the topics are listed from high level to low level, the sub-classifications of a topic are listed underneath the topic and indented, and the topics are ordered across a single level of the outline based on either the requirement links or alphabetical order. Because this editor will allow a topic to have any number of super links, a piece of an outline may be repeated in different places.

During the editing of a large knowledge structure, such as VMS, the author may need to work on the details of one part of the topic network without needing or being forced to weed through the rest. The topic outline and index views may be reduced with a "limited" browser function. The full topic view can be achieved with an "unlimited" browser function.

Discourse grammars (144), depicted in FIG. 7, may be built using a standard text editor. The discourse grammar is made up of grammar components (i.e., topics or sub-topics) that form a network such as the one represented in FIG. 8. Each node of the discourse grammar is defined in terms of the following attributes: (i) a nickname which is an internal label used to facilitate sequencing of grammar components; (ii) a context which is a textual description of the current state within the discourse grammar; (iii) a topic which is used to identify the topic to aggregate the specific grammar nodes student modeling data; (iv) a syntax which defines the specific situations, actions and other grammar nodes called by this grammar node, and a sequence and/or conditions of their execution.

Situation definitions are defined in terms of the following attributes: (i) a comment which is an area for comment by the authors; (ii) a text which is the actual situation definition;

and (iii) a type which identifies the type of situation. Information input into the text attribute can be text spoken to the trainee, text presented to the trainee, or specific application situation information, depending upon the identifier in the type attribute.

Action definitions are defined in terms of the following attributes: (i) a comment which is an area for comment by the authors; (ii) a text which is the actual action definition or correct response expected from the trainee; (iii) a type which identifies the type of situation; (iv) a feedback which is a specific feedback to present to the student should their response be incorrect; and (v) a false response which is a specific response to be used as distractors when presenting the trainee with multiple choice options. The text attribute can be in the form of text spoken by an expert CSR, the correct answer textually presented to the trainee or specific application commands, again depending upon the identifier in the type attribute.

The syntax employed in the grammar, situation and action definitions is defined in such a way so as to encompass both ends of a customer/CSR conversation. This syntax permits four types of control structures. A sequence control structure is that in which all objects must be executed in order. An AND control structure is that in which all objects must be executed but not in any specific order. An OR control structure is that in which one object must be executed. Finally, a group control sequence is that in which any number of objects can be executed in any order. These objects within these grammar descriptions can be either a statement from the customer or a specific application state, a response by the CSR to the customer, a reference to a specific statement, application state, response or other grammar, a grammar control structure, a label which determines that a conversation must halt, or an application command or description.

Thus, the grammar builder is a graphical tool for building and editing discourse grammars. An instructional designer or domain expert is able to use the discourse grammar by creating, instantiating and linking graphical objects to form a graphical representation of the actual discourse grammar. For example, referring to the discourse grammar presented in FIG. 8, instead of writing code the instructional designer might begin by using a set of graphical tools that would enable him to create, link and control various grammar nodes. By expanding or opening a top level grammar node, the author would be presented with another set of graphical tools designed to support the building of situation-action rules embedded within the top level grammar object. This would include tools for defining and linking situations and actions, identifying their type and the type of branch created downstream, and inputting feedback and false responses associated with those rules.

Given a completed discourse grammar, instructional designers and domain experts can then begin instantiating conversations for that grammar using the conversation author of the method and system of the present invention. The conversation author is a tool that allows authors to create conversations based on specific paths through or parts of the developed discourse grammar. The conversation author works by having the author select the grammar path, or part, to be instantiated. Next, they either select an existing conversation to edit, or else create and name a new conversation. Once the conversation is identified, they then execute the author functions.

During authoring, the method and system of the present invention execute the selected grammar path, or part, and present the author with a variety of different input fields depending upon the specific situation or action being executed. In the case of "verbal situations", the author would type in the customer statement, request or question into the verbal situation input field. In the case of "operational situations", the author would type in the simulation situation input field, the name of the screen and field that the resulting action would take place in. In the case of implicit situations for which there is no overt clue, or situations in which information is to be given to the trainee unconditionally, the author would input the information in the situation input field.

In the case of "verbal actions", the author would type in the CSR's response to the customer in the verbal action input field. In the case of "operational actions", the author would type in the correct response expected in the simulation action input field. In the case "cognitive actions", the author would type in the correct "decision" to be reached at that point in the conversation in the decision action input field. In the case of information to continue the contact uninterrupted, the author would input the information into the action input field.

Once the conversation is complete, it is saved and automatically indexed according to its high level scenario, as well as by the specific sub-topics of conversation components that comprise it. The saved conversation can then be edited or else used by the system and method of the present invention.

The simulation builder is intended to support the development of simulations of text-based operations systems. To build applications simulations, the method and system of the present invention may use a known operations. system (OS) editor. Such an OS editor provides tools to support an author's capturing, naming and describing application screens, classifying and "typing" of the fields of importance in those screens, describing each field, entering commands that can be input into the screens command fields, and entering descriptions of each command. The output of the OS editor are files that adhere to a specific format that can be interpreted by the system and method of the present invention to dynamically build the screens, as well as control the behavior within and among the screens. Alternatively, application simulations can be developed by writing the above files, in the previously described format, using text editor, based on observations of the applications screens and their behavior.

Tutoring decisions in the present invention consist of determining what the user should study next and how the user should study it. These decisions are based on characteristics of both the study material and the user. Study material is divided into topics, with presentations and exercises for each topic. The present invention recommends specific topics, presentations and exercises. The present invention also contains a variety of learning methods for studying the material in the exercises. In general, the present invention makes tutoring decisions but does not force them on the user, instead putting them forth as recommendations.

With respect to tutoring decisions, the present invention also includes a parameter adjusting function. Based on a set of parameters that can be adjusted by course developers and instructors, the present invention makes its instructional decisions on what topics to recommend (topic choice), what conversation to execute (conversation choice), how to evaluate a trainee's responses (student modeling) and how to apply its within-practice instructional methods (question probabilities). The parameter adjuster is designed so that the weights given to each factor can be easily modified. The weights, and hence the contributions, of each factor can be varied on a continuous scale from zero (no contribution) to 100 (full contribution). In addition, these factors may be interrelated so that increasing the weight of one factor will produce uniform decreases to the weights of the other factors, and vice versa. The factor can likewise be removed from the decision making process altogether, can be the sole consideration in the decision, or anywhere in between. Thus, the present invention has the functionality to allow knowledgeable persons to revise decision making strategies.

Indeed, a CSR trainee can elect the degree of active tutoring they receive from the present invention, from 0 to 100%. At 0% tutoring, the user makes all the instructional decisions. The user is in charge of the entire learning process, selecting conversations or topics to practice and the methods to practice them by. The present invention provides situation-action pair feedback, but acts mostly as a bookkeeper, updating the student model.

At 100% tutoring, the present invention makes all the instructional decisions, freeing the user to concentrate on learning the subject matter itself. The present invention selects the topic for the user to study, determines when the topic has been mastered, and when its time to move on. The present invention selects the conversation most suitable for the current topic and sequences the user therethrough, choosing fresh conversations or revisiting previously seen conversations as necessary. The present invention selects the method by which the user studies each conversation, increasing the user's involvement in the conversation until the topic is mastered. Within each conversation, the present invention decides when to skim and when to scaffold each situation-action pair for learning to take place at an optimal rate. Significantly, users can elect some intermediate degree of active tutoring, they can accept or reject any tutoring recommendations, change the conversation study methods at any time, and exit any exercise at any time.

More specifically, now, topic choice is a function within the parameter adjuster which is based on three interrelated factors: (i) sequential ordering of topics (as represented in the topic/sub-topic structure); (ii) relationship to the last topic/sub-topic studied; and (iii) the trainee's proficiency on each topic/sub-topic. The sequential order of topics represents the sequence determined in accord with current and structural design practices. In other words, if an instructor desires to go the "best and only" route through the course, it would be represented by this sequential order. However, different trainees learn best in different orders, so the two other factors permit a "resequencing" of the topics recommended to the trainee. Relation to the last topic influences recommendations on a conceptual relatedness rather than sequential level. With regard to proficiency, the author can select from among three predefined prioritization settings that differ with regard to the way the tutor recommends training progress through topics in the "untried" to "almost" categories.

In that regard, an instructor may choose to elevate a trainee's proficiency on individual topics/sub-topics to a "good" rating before proceeding to other topics by selecting a prioritization setting wherein the method and system of the present invention will recommend topics for trainee study based upon an "almost" to "needs practice" to "untried" rating sequence. An instructor may also choose to elevate a trainee's proficiency on individual topics/sub-topics to a "good" rating before proceeding to other topics by selecting a prioritization setting wherein the present invention will recommend topics for trainee study based upon a "needs practice" to "untried" to "almost" rating sequence. Finally, an instructor may further choose to elevate a trainee's proficiency on individual topics/sub-topics to a "good" rating before proceeding to other topics by selecting a prioritization setting wherein the present invention will recommend topics for trainee study based upon an "untried" to "needs practice" to "almost" rating sequence.

Conversation choice is a parameter based on six factors, five of which are interrelated. These factors include the relation of the conversation choice to the selected topic, the complexity of the conversation in terms of the number of situation-action rules therein, the number of times the conversation has already been seen or practiced by the trainee, the trainee's current skill level on the conversation, an independent teacher preference rating, and the trainee's preference for hard versus easy conversations (the only independent factor).

With respect to the number of times a student has already practiced the conversation, the present invention selects less frequently practiced conversations in preference to those previously practiced. With respect to the student's current skill level, the student's scores for all of the situation-action pairs in the topic are averaged to get a current difficulty rating for each conversation. That calculated difficulty rating is used to rank conversations in light of the user's preference. These factors are weighted and summed for each conversation and the top ranked conversation is selected.

More specifically, the relation to the topic is measured by the number of grammars touched by the conversation that are also touched by the topic. Topics more related are favored. The number of times a conversation is practiced is inversely favored. The conversation instruction preference is a number editable by the course developer. The conversation challenge is a combination of the complexity of the conversation as measured by the length thereof, and the predicted conversation proficiency as measured based on the student model of the actions that this conversation touches. The percentage of actions touched is multiplied with the proficiency ratings of those actions. The conversation challenge factor favors conversations that are deemed easy, so that students are started with easy conversations and work toward harder conversations.

These factors are normalized to the same scale and then weighted with 33% for the relation to the topic, 33% for the number of times seen, 5% for the teacher preference, 17% for the complexity, and 12% for the predicted conversation proficiency. Although these weightings are adjustable instruction parameters, the given weightings guarantee that the conversation relates to the chosen topic, has not been previously practiced a lot, and is one of the easier conversations of those not yet practiced.

Depending upon the configuration of these various factors, conversation choice can be set to achieve any of several different instructional objectives. First, the conversation selected can provide the trainee with further practice on those parts of the conversation they had difficulty with. For example, high emphasis may be placed on relation to selected topic, while low emphasis is placed on number of times seen or practiced. Second, the conversation selected may exercise new knowledge not practiced before. For example, low emphasis may be placed on relation to selected topic, while high emphasis is placed on the number of times seen or practiced. Finally, the conversation selected may incrementally add new knowledge to an existing conversation at which the user has demonstrated proficiency. For example, high emphasis may be placed on relation to selected topic and on the number of times seen or practiced.

As previously stated, the present invention recommends a conversation for trainee study based on its relation to the current topic, its complexity, and its overall importance ranking. The complexity measure is combined with the trainee's current skill to get an overall difficulty rating for the conversation. The overall importance ranking is assigned by the author. This factor permits any arbitrary ordering of conversations the author might choose. For example, the author might rank conversations depicting frequently occurring situations above those with equally important but rarely occurring situations. Also, the author may rank conversations depicting rare, critical situations above frequent, unimportant situations.

After selecting a conversation, a study method for that conversation is selected. The three ways to study an individual conversation are the "observe", "focused practice" and "full practice" modes previously described. If the user has not yet observed any conversations in a specific topic, then present invention recommends "observe." Otherwise, a default recommendation of "focused practice" is made. The user, of course, may also elect "full practice."

As previously described, in full practice mode, after each database command or entry the user makes, situation-action pair feedback is given. In general, if the user's database action is correct, the conversation simply continues. However, if the database action is incorrect, detailed feedback is provided. Situation-action feedback is contrasted with conversation feedback, which occurs after the conversation has been completed.

At the end of each contact rehearsal or examination, the method and system of the present invention provide for several different types of feedback, selectable by the trainee. This approach includes a view summary feedback type where trainees can view a brief, digitized video of an expert CSR summarizing the salient points and features of the previous contact. A repeat conversation feedback type allows the trainee to redo the previous contact using the same or different instruction style settings for dialog and application interactions. With a selective review feedback type, the trainee can listen to all or part of the contact just practiced, reviewing and comparing their recorded responses to an expert recorded response. Finally, with a summarized progress feedback type, the trainee can view an assessment, including any changes, of the trainee's proficiency with regard to various topics.

As previously described, trainee response evaluation is implemented during contact rehearsal and is based on three interrelated factors. The first factor is the average correct score when the trainee is asked a specific questions. The second factor is the number of consecutive correct, or incorrect, responses when a trainee is asked a specific question. The final factor is the number of times the item is seen but not asked. This capability may also include response latencies and times.

Using these factors in a function whose weights are adjustable provides advantages over student model based only on average correct scores. More specifically, trainees receive credit for observing the correct answer even if they do not have to provide that answer themselves since it is known that seeing an answer positively contributes to one's ability to remember and recall that answer. Including consecutive correct or incorrect answers helps to accommodate for "lucky guesses." By tempering the average score (which could be positively influenced by chance) with a record of the direction and consistency of the trainee's response to that item, one gets a more robust estimate of how well the trainee knows that item.

The application of within-practice instructional methods (i.e., "skim" and "scaffold") is the only parameter adjusting function in which the parameters are not interrelated. In this function, the author can set the parameters for skim (in topic) and scaffold (out of topic) separately. However, each uses identical parameters: (i) question the trainee when not known; (ii) question the trainee when known; and (iii) decrease questioning when known.

The function that determines whether to have the student perform an action uses two factors. The first factor is whether or not the action is part of the topic they are currently studying. The second factor is the student's performance evaluation on that action. The function uses two decision tables, an in-topic table and an out-of-topic table. The tables define the probability of asking for the student to perform given the current performance evaluation. The function then makes its decision based on the probability and a randomly selected number between 0 and 1. The skimming and scaffolding decision tables are adjustable, using the instruction parameters.

Figure 9:
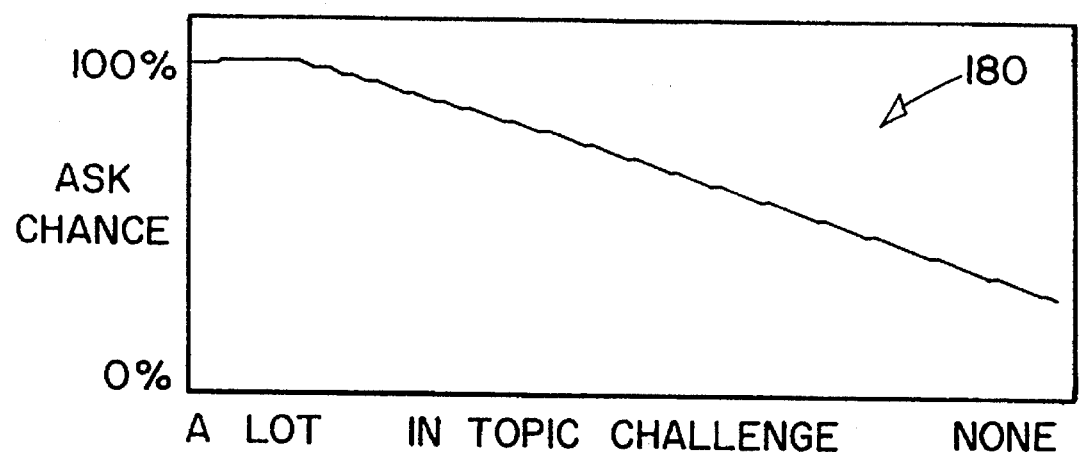
FIG. 9 is an in-topic question probability graph for the intelligent tutoring method and system of the present invention.

Referring now to FIG. 9, an in-topic probability graph is shown, denoted generally by reference numeral 180. With regard to skimming information that is "in-topic", the question when not known parameter is set to "always" as a default. The objective is to get trainees to practice that information within the topic they are studying that they do not yet know. The question when known parameter is set at the midpoint as a default and refers to how often an instructor wants the trainee to be prompted to respond to something they already know—just enough to keep the information active. The decrease questioning when known factor refers to how gradually an instructor wants to stop asking a trainee something the trainee has demonstrated he knows.

As seen therein, "in-topic" challenge is the reciprocal of the student model. The student model for each situation-action pair falls somewhere between "a lot" and "none", and the graph shows the odds (the "ask chance") of the user being asked to perform the situation-action pair. If the user is not asked, the situation-action pair is skimmed.

Figure 10:
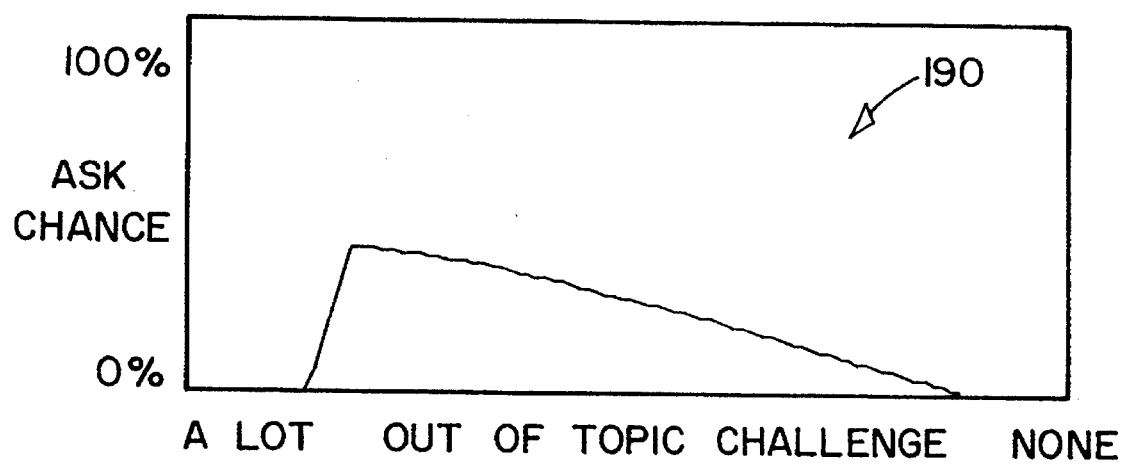
FIG. 10 is an out-of-topic question probability graph for the intelligent tutoring method and system of the present invention.

Referring now to FIG. 10, an out-of-topic question probability graph is shown, denoted generally by the reference numeral 190. With regard to scaffolding information that is "out-of-topic", the question when not known parameter is set to "never" as a default. The objective is not to frustrate trainees by making them answer items where there is no reason to believe they yet know such answers. However, the more times a trainee sees an item that is unknown and out of topic, an assessment is updated to a point where it reflects some level of knowledge for those items seen but not practiced. This is where the question when known factor comes in. The trainee begins to be prompted for a response to items that are out of topic but that they should have some knowledge of. The default setting for this parameter is at the midpoint. The decrease questioning when known parameter is the same for out-of-topic scaffolding as for in-topic skimming, described above.

As seen therein, "out-of-topic" challenge is identical to the "in-topic" except for two features. First, in general, the curve is lower for the current topic, indicating that the user is less likely to be asked to respond to any situation-action pair that is not in the current topic. Second, the left end of the curve shows how scaffolding is implemented. When the "challenge level" of a situation-action pair is high, the "ask chance" is zero. That is, the user will not be asked to perform a situation-action pair that is unpracticed and out-of-topic.

Thus, as is readily apparent from the foregoing description, the intelligent tutoring method and system of the present invention will recommend a topic, a conversation, and a set of situation-action pairs for the user to study. The present invention also has a selection method for each level of domain knowledge including topics, conversations and situation-action pairs. The method for each level of knowledge is based on a number of factors, some characteristic of the knowledge, others characteristic of the user's state. Each of the factors considered is accessible through an author, which can be used to increase or decrease the factors weight in the knowledge selection process. The method by which the present invention selects content for study can thus be radically, yet easily, altered.

Moreover, the intelligent tutoring method and system of the present invention recommend a method to study the materials it selects. In that regard, the present invention has a set of study methods for each level and a method selection mechanism for each level. In general, the methods range from the cognitively simple to the cognitively complex and the present invention recommends them in sequence from simple to complex.

For each topic, knowledge may be presented declaratively in presentations (in the guide), procedurally in conversation exercises (in rehearse conversations), and abstractly in conversation space (in examine contact flow). Declarative knowledge is studied in multi-media presentations. Procedural knowledge (and its abstraction, the grammar) are studied with three increasingly complex methods known as "observe", "focused practiced", and "full practice". These methods are applied independently to database situation-action pairs and to spoke situation-action pairs for a total of six (3×2) levels of user involvement. Within a conversation, situation-action pairs may be presented in a variety of ways progressing from one to the next as the user's skill develops, including "scaffold" and "skim." Users are fluent and their training is complete when they can skim all situation-action pairs.

Moreover, as is readily apparent to those of ordinary skill, the intelligent tutoring method and system of the present invention is computer based. In that regard, the present invention is designed for use with a conventional computer system which, along with appropriate software, is employed as the means for accomplishing the various specific functions described above.

The intelligent tutoring method and system of the present invention has been described and shown herein in conjunction with tutoring a student regarding a voice messaging application. However, it should be readily apparent that the method and system of the present invention are suitable for use with any application wherein intelligent tutoring may be desired.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. A computer based intelligent method for tutoring a student in an interactive application, the method comprising:

providing a teaching parameter having a plurality of adjustable factors;

selecting a contribution percentage for each of the plurality of adjustable factors of the teaching parameter;

generating a student model;

monitoring a student interactive task based upon the teaching parameter and the student model;

generating an updated student model based upon a student response to the student interactive task generated; and monitoring a student interactive task based upon the teaching parameter and the updated student model.

2. The method of claim 1 wherein the teaching parameter having a plurality of adjustable factors comprises a topic parameter having a sequential factor, a last studied relationship factor, and a student proficiency factor.

3. The method of claim 1 wherein the teaching parameter having a plurality of adjustable factors comprises a student/contact conversation parameter having a selected topic factor, a complexity factor, a student interaction factor, a student proficiency factor, a teacher preference factor, and a student preference factor.

4. The method of claim 1 wherein the teaching parameter having a plurality of adjustable factors comprises a student parameter having an average correct factor, a consecutive correct factor, and an observe factor.

5. The method of claim 1 wherein the teaching parameter having a plurality of adjustable factors comprises a question probability parameter having an in-topic component and an out-of-topic component, each in-topic and out-of-topic component having a question when known factor, a question when unknown factor, and a decrease questioning when known factor.

6. The method of claim 1 wherein generating an updated student model comprises: providing a student model data structure representing a plurality of student interactive tasks to be learned; mapping the student response to the student model data structure; and processing the student model data structure to determine a confidence estimate for each of the plurality of student interactive tasks to be learned.

7. The method of claim 1 wherein monitoring a student interactive task based upon the teaching parameter and the updated student model comprises:

generating a student/contact situation; and recording the student action responsive to the student/contact situation.

8. The method of claim 7 wherein generating a student/contact situation comprises:

selecting one of a plurality of student/contact conversations, each conversation having a contact dialog component and a contact service component; and synthesizing a student audible version of the contact dialog component.

9. The method of claim 8 wherein the adjustable teaching parameter comprises a student practice parameter having a contact dialog component and a contact service component, each contact dialog and contact service component having an observe mode, a focused practice mode, and a full practice mode.

10. A computer based intelligent system for tutoring a student in an interactive application, the system comprising:

a teaching parameter having a plurality of adjustable factors;

means for selecting a contribution percentage for each of the plurality of adjustable factors of the teaching parameter;

means for generating a student model;

means for monitoring a student interactive task based upon the teaching parameter and the student model;

means for generating an updated student model based upon a student response to the student interactive task generated; and means for monitoring a student interactive task based upon the teaching parameter and the updated student model.

11. The system of claim 10 wherein the teaching parameter having a plurality of adjustable factors comprises a topic parameter having a sequential factor, a last studied relationship factor, and a student proficiency factor.

12. The system of claim 10 wherein the teaching parameter having a plurality of adjustable factors comprises a student/contact conversation parameter having a selected topic factor, a complexity factor, a student iteration factor, a student proficiency factor, a teacher preference factor, and a student preference factor.

13. The system of claim 10 wherein the teaching parameter having a plurality of adjustable factors comprises a student parameter having an average correct factor, a consecutive correct factor, and an observe factor.

14. The system of claim 10 wherein the teaching parameter having a plurality of adjustable factors comprises a question probability parameter having an in-topic component and an out-of-topic component, each in-topic and out-of-topic component having a question when known factor, a question when unknown factor, and a decrease questioning when known factor.

15. The system of claim 10 wherein the means for generating an updated student model comprises:

a student model data structure representing a plurality of student interactive tasks to be learned;

means for mapping the student response to the student model data structure; and means for processing the student model data structure to determine a confidence estimate for each of the plurality of student interactive tasks to be learned.

16. The system of claim 10 wherein the means for monitoring a student interactive task based upon the teaching parameter and the updated student model comprises:

means for generating a student/contact situation; and means for recording the student action responsive to the student/contact situation.

17. The system of claim 16 wherein the means for generating a student/contact situation comprises:

means for selecting one of a plurality of student/contact conversations, each conversation having a contact dialog component and a contact service component; and means for synthesizing a student audible version of the contact dialog component.

18. The system of claim 17 wherein the adjustable teaching parameter comprises a student practice parameter having a contact dialog component and a contact service component, each contact dialog and contact service component having an observe mode, a focused practice mode, and a full practice mode.

\* \* \* \* \*